(12) United States Patent
Narth et al.

(10) Patent No.: US 11,675,874 B2
(45) Date of Patent: *Jun. 13, 2023

(54) CONTENT MANAGEMENT SYSTEMS FOR PROVIDING AUTOMATED GENERATION OF CONTENT SUGGESTIONS

(71) Applicant: Open Text Holdings, Inc., San Mateo, CA (US)

(72) Inventors: Paul Kieron Carl Narth, San Carlos, CA (US); Gregory Aaron Parmiter, Mercer Island, WA (US); Jason Jackson, San Jose, CA (US); Partha Saradhi Govind, Cedar Park, TX (US)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/865,132

(22) Filed: Jul. 14, 2022

(65) Prior Publication Data

US 2022/0358181 A1 Nov. 10, 2022

Related U.S. Application Data

(63) Continuation of application No. 16/676,759, filed on Nov. 7, 2019, now Pat. No. 11,423,114.

(51) Int. Cl.
*G06F 16/95* (2019.01)
*G06F 16/958* (2019.01)
(Continued)

(52) U.S. Cl.
CPC ........ *G06F 16/972* (2019.01); *G06F 16/3323* (2019.01); *G06F 16/358* (2019.01); *G06F 16/957* (2019.01); *G06F 40/14* (2020.01)

(58) Field of Classification Search
None
See application file for complete search history.

(56) References Cited

U.S. PATENT DOCUMENTS 6,192,362 B1 2/2001 Schneck
6,374,271 B1 4/2002 Shimizu
(Continued)

OTHER PUBLICATIONS

Notice of Allowance for U.S. Appl. No. 16/676,751, dated Nov. 30, 2022, 10 pgs.

(Continued)

*Primary Examiner* — Maikhanh Nguyen
(74) *Attorney, Agent, or Firm* — Sprinkle IP Law Group

(57) ABSTRACT

Systems for automatically suggesting content items to an author of a digital page so that they can be added to the page. One embodiment comprises a system having a page editor that launches a component browser to enable viewing of content items stored in a repository. A web content management server extracts textual information from a digital page that is open for editing and analyzes the information to identify words indicative of the page's subject matter. The system generates a query using the identified words and a search engine searches the repository for items associated with the identified words. The content items identified by the search are displayed by the component browser and are selectable to add particular suggested content items to the page.

18 Claims, 5 Drawing Sheets

(51) Int. Cl.
   *G06F 16/35*    (2019.01)
   *G06F 16/332*   (2019.01)
   *G06F 16/957*   (2019.01)
   *G06F 40/14*    (2020.01)

(56) References Cited

U.S. PATENT DOCUMENTS

| | | | | |
|---|---|---|---|---|
| 8,650,031 | B1* | 2/2014 | Mamou | G06F 16/00 |
| | | | | 707/738 |
| 9,483,449 | B1 | 11/2016 | Wood | |
| 10,409,898 | B2* | 9/2019 | Sharma | G06N 3/044 |
| 10,685,050 | B2* | 6/2020 | Krishna | G06N 3/047 |
| 11,017,179 | B2* | 5/2021 | Hutchins | G06F 40/35 |
| 11,216,521 | B2* | 1/2022 | Govind | G06F 3/0482 |
| 11,620,351 | B2 | 4/2023 | Parmiter | |
| 2002/0046235 | A1 | 4/2002 | Foy | |
| 2002/0091671 | A1 | 7/2002 | Prokoph | |
| 2003/0014443 | A1 | 1/2003 | Bernstein | |
| 2008/0082426 | A1* | 4/2008 | Gokturk | G06Q 30/0623 |
| | | | | 707/E17.014 |
| 2008/0109425 | A1* | 5/2008 | Yih | G06F 16/345 |
| | | | | 707/999.005 |
| 2010/0325531 | A1 | 12/2010 | Petronijevic | |
| 2011/0314041 | A1 | 12/2011 | Drucker | |
| 2012/0035912 | A1 | 2/2012 | Litvak | |
| 2012/0151310 | A1* | 6/2012 | El-kalliny | G06F 16/9535 |
| | | | | 707/769 |
| 2013/0145252 | A1 | 6/2013 | Lie | |
| 2014/0173426 | A1* | 6/2014 | Huang | G06F 40/166 |
| | | | | 715/256 |
| 2015/0046791 | A1 | 2/2015 | Isaacson | |
| 2015/0178786 | A1* | 6/2015 | Claessens | G06Q 30/0277 |
| | | | | 705/14.66 |
| 2015/0213062 | A1* | 7/2015 | Gokturk | G06V 20/10 |
| | | | | 715/748 |
| 2017/0161372 | A1 | 6/2017 | Fernandez | |
| 2017/0277663 | A1* | 9/2017 | Reimherr | G06F 3/0481 |
| 2018/0032636 | A1 | 2/2018 | Mullaney | |
| 2019/0027188 | A1 | 1/2019 | Akolkar | |
| 2019/0163691 | A1 | 5/2019 | Brunet | |
| 2019/0236148 | A1 | 8/2019 | DeFelice | |
| 2019/0394511 | A1 | 12/2019 | Kalaboukis | |
| 2020/0125575 | A1* | 4/2020 | Ghoshal | G06F 16/907 |
| 2020/0279017 | A1 | 9/2020 | Norton | |
| 2021/0019339 | A1 | 1/2021 | Ghulati | |
| 2021/0141790 | A1* | 5/2021 | Narth | G06F 16/958 |
| 2021/0141846 | A1* | 5/2021 | Parmiter | G06F 40/166 |
| 2021/0141847 | A1* | 5/2021 | Govind | G06V 30/40 |
| 2021/0166014 | A1 | 6/2021 | Zhang | |
| 2022/0325319 | A1 | 10/2022 | Quake | |

OTHER PUBLICATIONS

Cabral, Luciano, Lima, Rinaldo, Lins, Rafael, Neto, Manoel, Ferreira, Rafael, "Automatic Summarization of News Articles in Mobile Devices", 2015 Fourteenth Mexican Int'l Conf. on Artificial Intelligence (MICAI), IEEE, 2015, pp. 8-13.

Notice of Allowance for U.S. Appl. No. 17/546,678, dated Dec. 30, 2022, 2 pgs.

Notice of Allowance for U.S. Appl. No. 17/329,023, dated Feb. 13, 2023, 7 pgs.

Office Action for U.S. Appl. No. 17/227,124, dated Feb. 16, 2023, 28 pgs.

Office Action for U.S. Appl. No. 16/676,751, dated Jul. 20, 2022, 41 pgs.

Office Action for U.S. Appl. No. 17/546,678, dated Sep. 14, 2022, 31 pgs.

Office Action for U.S. Appl. No. 17/572,727, dated Sep. 29, 2022, 27 pgs.

Office Action for U.S. Appl. No. 17/227,125, dated Oct. 3, 2022, 28 pgs.

Office Action for U.S. Appl. No. 17/465,318, dated Oct. 3, 2022, 35 pgs.

Office Action for U.S. Appl. No. 17/329,023, dated Oct. 27, 2022, 15 pgs.

Office Action for U.S. Appl. No. 17/572,727, dated Apr. 6, 2023, 29 pgs.

Notice of Allowance for U.S. Appl. No. 17/546,678, dated Apr. 18, 2023, 2 pgs.

Office Action for U.S. Appl. No. 17/465,318, dated Apr. 21, 2023, 20 pgs.

* cited by examiner

CONTENT MANAGEMENT SYSTEMS FOR PROVIDING AUTOMATED GENERATION OF CONTENT SUGGESTIONS

RELATED APPLICATION(S)

This application is a continuation of, and claims a benefit of priority under 35 U.S.C. 120 of, U.S. patent application Ser. No. 16/676,759 filed Nov. 7, 2019, entitled "CONTENT MANAGEMENT SYSTEMS FOR PROVIDING AUTOMATED GENERATION OF CONTENT SUGGESTIONS," now U.S. Pat. No. 11,423,114, which is hereby incorporated herein for all purposes.

TECHNICAL FIELD

This disclosure relates generally to providing access to services, and more particularly to systems for content management in which the subject matter of a digital page is determined, and the content items in a content repository are searched to identify items that are relevant to the page's subject matter so that these items can be presented to a user in a page editor for addition to the digital page.

BACKGROUND

Web content management systems enable enterprises to easily manage and publish digital content. Web content management systems may include various capabilities, such as site design, content authoring, site and content editing and personalization. Web content management systems enable users to deliver rich digital customer experiences across many different digital channels, including websites, mobile platforms, email, social, commerce, composite applications, collaboration sites and portals, and more. A robust content management system can allow organizations to manage multiple websites, support multiple languages, and deliver multi-channel customer experiences.

Existing web content management systems allow authors to create digital pages that are directed to a wide variety of subjects. The authors may create original documents to present in their pages, or they may select existing content items to be added to the pages. Commonly, the web content management systems are connected to repositories of content that may include many documents, images, and other types of content from which the authors may choose.

When an author creates or edits a digital page, the author may use a component browser or an image browser to view the content items that are available in a content repository. If the author wishes to use one of the content items in the repository, the desired item may be selected to be added to the page. This is generally a simple and straightforward process, but the repository may contain a vast number of content items, so it may take a great deal of time for the author to look through the available items, determine their relevance to the page, and identify specific items that the author wishes to add to the page. It would therefore be desirable to provide means to automatically identify relevant content items in the repository and present these items to the author so that they can be quickly and easily added to the author's digital page.

SUMMARY

The present disclosure details systems for automatically analyzing page content, searching for content items relevant to the subject matter of the page, and making these items available to an author so that they can be added to the page.

One embodiment comprises a web content management system that is configured to generate content suggestions for a digital page that is being edited. In this embodiment, the system includes a web content management server, a content repository, a digital page editor, a component browser and a search engine. The content repository is coupled to the web content management server and is configured to store a set of content items. The digital page editor is configured to edit a digital page and is coupled to the content repository and is configured so that it can retrieve content items from in the content repository and add them to the page. The component browser is launched from the page editor and enables viewing of the content items stored in the content repository. The content items displayed by the component browser can be selected to add them to the digital page. The search engine is accessible by the component browser through the web content management server and can be used to search for content items in the content repository. The web content management server is configured to extract textual information from the digital page currently being edited by the page editor. In some embodiments, the component browser is configured to provide a path for the digital page to the web content management server, so that the web content management server can access the page via the path to extract the needed textual information. In one embodiment, the web content management server is configured to extract the textual information from the filename and properties of the digital page. Alternatively, the textual information can be extracted from a text-based content item contained in the digital page, or from metadata of content items contained in the digital page.

The web content management server analyzes the extracted textual information and identifies words in the extracted information that are relevant to the subject matter of the digital page. In one embodiment, the web content management server is configured to perform a TF-IDF (term frequency—inverse document frequency) analysis on the extracted textual information of the digital page, where words which have a higher frequency are taken to be more relevant to the subject matter of the page. Based at least in part on the identified words, the web content management server generates a suggested content query. The search engine is configured to receive the suggested content query from the web content management server and to search the content repository for content items responsive to the query. The search engine identifies to the web content management server a set of content items in the content repository that are responsive to the suggested content query (i.e., have associated keywords found in the query). The search results are provided from the search engine to the web content management server, which provides them as suggested content items to the component browser. The component browser displays the suggested content items to a user in the page editor and, responsive to selection of one of the suggested content items, the page editor adds the selected content item to the digital page.

In some embodiments, a runtime environment is coupled to the web content management server and the search engine. The runtime environment is configured to receive an initial query that contains the one or more terms which are indicated by the TF-IDF analysis from the web content management server. The runtime environment generates the suggested content query by generating a plurality of permutations of these terms (e.g., in an eDisMax-type query). The search engine is configured to search the content repository using indices that are generated by an indexer in the system based on the content items in the repository. The indexer is configured to generate the indices using keywords in tags that are associated with corresponding content items and stored in the repository. The keywords may be tagged to the content items manually using a tagging module of the system. In some embodiments, image content items may be uploaded and keywords that are associated with the subject matter of the images, as determined by an image recognition service, may be associated with the Image content items by an automated tagging module.

Numerous alternative embodiments may also be possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
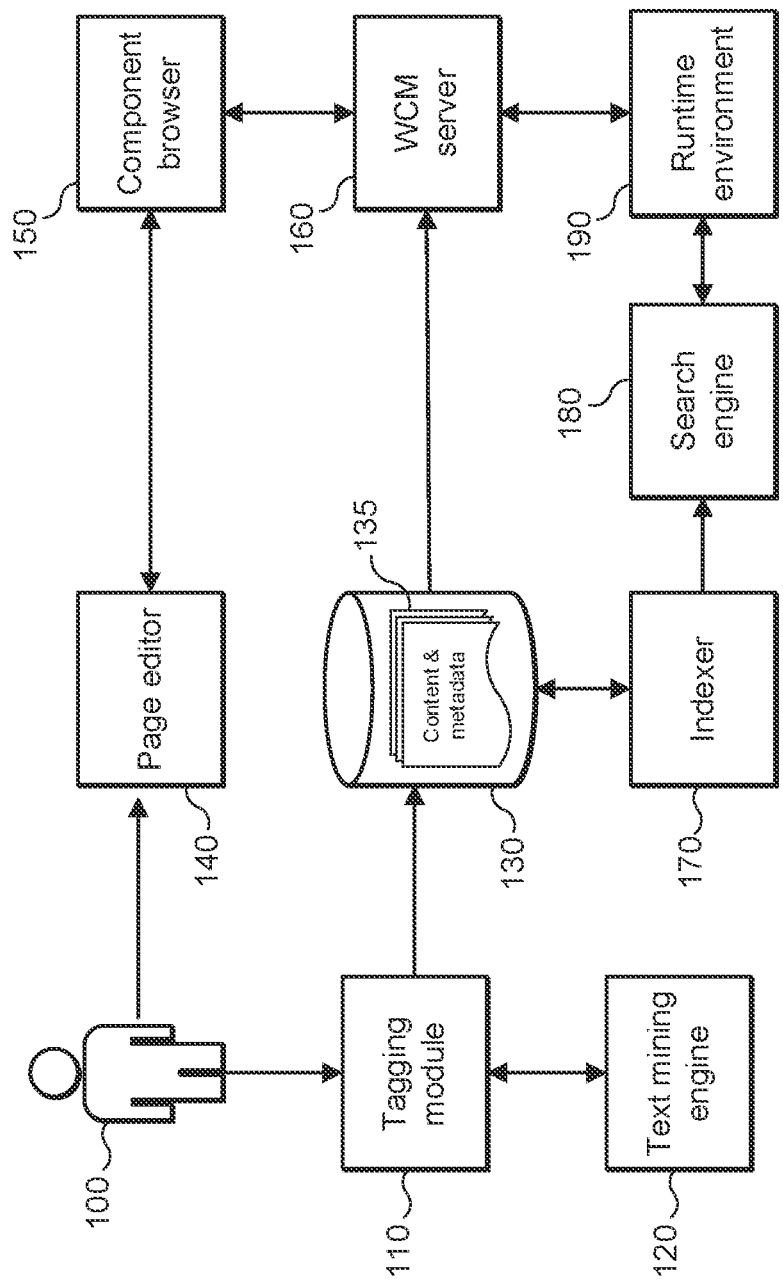
FIG. 1 is a block diagram illustrating the structure a web content management system in accordance with the prior art.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

One exemplary web content management system is OpenText™ TeamSite™. This is a website content management system that helps organizations create personalized and visually rich digital customer experiences that can be optimized for any device, digital channel or context. This website content management system simplifies the process of managing content across all channels to make delivering high quality digital experiences easier. From a single interface, a user can author, test, target and publish their content, and also manage rich media, design websites and create mobile applications.

Embodiments of the present invention provide systems for web content management which automatically identify content items that are relevant to the subject matter and then search for content items in a content repository which may be relevant to that subject matter so that they can be presented to a user as suggested content for the page. In one embodiment, a system includes a web content management server, a content repository, a digital page editor, a component browser and a search engine. The content repository is coupled to the web content management server and is configured to store a set of content items. The content items can be retrieved by a page editor and added to the digital page. The page editor may launch a component browser to enable viewing of content items stored in the repository and allow the content items to be selected and added to the digital page. The component browser may provide a path for the digital page to a web content management server that extracts textual information from the page and analyzes it to identify words in the text that are relevant to the subject matter of the page. Using these words, the web content management server generates a suggested content query. A runtime environment may restructure the query to cover various permutations of word combinations. The query may be provided to the search engine, which searches the content repository (via keyword indices created by an indexer) for content items responsive to the query. The content items responsive to the query are provided to the web content management server, and then to the component browser, which displays these suggested content items to a user of the page editor. The user may select one of the suggested content items in the component browser, adding the selected content item to the digital page.

Before describing the present embodiments, it may be helpful to present an example of a prior art web content management system. An example of such a system is illustrated in FIG. 1. The general structure of a prior art system for managing web content is depicted in this figure. Beginning at the upper left-hand portion of the figure, a user 100 can take two different actions. The user can edit the page, or the user can tag content. If the user tags content, an image tagging module 110 will communicate with a text mining engine 120, and information is exchanged between these two components. Image tagging module 110 provides any text content and metadata to the text mining engine, and the text mining engine then uses this information to retrieve suggested keywords and a summary for the tagged image. The keywords and summary are then returned, and they are returned and used to update the metadata 135 for the image. This metadata is stored in a repository 130, alongside the image itself.

User 100 can also edit a page using the page editor 140 of the web content management system. ("Editing", as used here may include not only editing existing pages, but also creating new pages and editing these pages.) Page editor 140 can invoke a component browser 150. Component browser 150 communicates with a backend web content management service 160, allowing the user to pick specific content items from repository 130 to be used in the page that is being edited. The content in repository 130 is indexed by indexer 170 and search engine 180 so that the content can be used by runtime environment 190. Indexer 170 extracts words from the content and metadata in repository 130 and provides this information to the search engine, which indexes the words. Search engine 180 provides basic keyword search capabilities to runtime environment 190. When search engine 180 is queried for certain keywords, it returns the documents associated with those keywords.

Thus, the web content management system of FIG. 1 allows a user to author webpages and to add content to these pages by using a component browser to view and select content items that are stored in a content repository. The user may search the available content items using tags that have been added to the content items, and that are stored with the content items. This system may find keywords and summaries of content which may be automatically tagged onto the content items and stored with the metadata of the content items in the repository.

Figure 2:
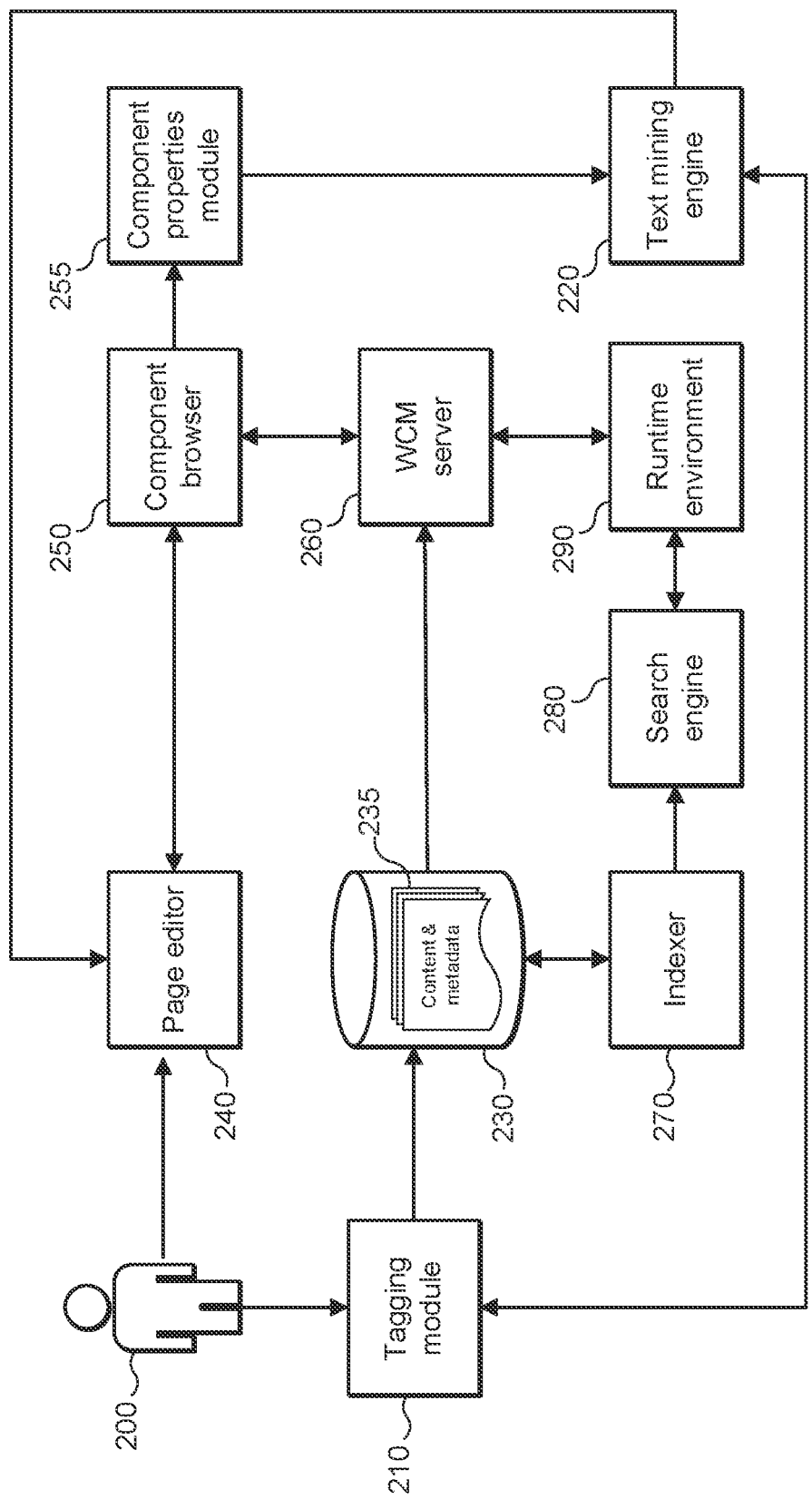
FIG. 2 is a block diagram illustrating the structure a web content management system which is configured to automatically generate summaries of content items in accordance with some embodiments.

Embodiments of the present invention provide a web content management system that builds upon the structure of the system illustrated in FIG. 1, but may provide additional functionality. Referring to FIG. 2, an embodiment is depicted which provides the additional functionality of automatically generating new content items which are summaries of selected, existing content items.

In authoring a webpage, it is often important to consider "real estate". Customers of the web content management system (e.g., businesses or other organizations) commonly have pieces of content which have been written so that they can be presented to users (e.g., customers of the businesses) on a website. Often, there are several pieces of content which are large enough that they cannot all be viewed by the users of the website at the same time. This issue is further complicated by the fact that digital content such as webpages may be intended to be viewed on many different devices, each of which has its own capabilities and limitations in regard to the display of this content. For example, a page that is displayed on a desktop or laptop computer may have a relatively large area for displaying content, while a smaller device such as a tablet computer or a smart phone may have considerably less area in which the content can be displayed the owner of the page may need to take this into account in determining how to construct the page and how to display content items within the page.

This may be addressed in several ways. For example, all of the content (unabridged) may be added to a webpage, but it may be necessary for a user to scroll through the page to view all of the content. Another way to handle this issue is to present users with a page that contains summaries of the different pieces of content, where the summaries can all be viewed at the same time, or at least with a much smaller amount of scrolling that would be necessary to view the full pieces of content. Frequently, the webpage will present each summary with a corresponding link to the full content item. Thus, a user can quickly review summaries for the different content items and determine which of the items they wish to view in their entireties.

When an author wishes to create a webpage that includes summaries of content items, it is conventionally necessary for the author to create the summaries. In other words, the author must review the full content item and manually create an alternative, summarized expression of the content. This is often a tedious and time-consuming process, with the author having responsibility for examining the content, identifying key concepts in the content, and generating a summary that meets the desired size requirements. Embodiments of the present systems prevent the author from having to perform these functions.

Referring again to FIG. 2, a web content management system which is configured to automatically generate a summary responsive to user selection of a content item in accordance with some embodiments is shown. The structure of the web content management system in this figure is, in some respects, similar to that of the system depicted in FIG. 1. In this system, a user 200 can access a content tagging module 210 which allows the user to tag images with keywords or summaries related to the content item. In this embodiment, content tagging module 210 is coupled to a text mining engine 220 which is configured to examine the text content of a particular content item and to use this text to identify keywords and/or summaries that may potentially be relevant to the content item. Text mining engine 220 may identify these potentially related keywords and summaries based on textual content of the item itself, or text contained in the metadata associated with the item. The keywords and/or summaries that are identified by text mining engine 220 may be returned to tagging module 210, which may present them to the user. The user may then select one or more of the keywords and/or summaries to be used as tags for the content item. If the user approves the use of one or more of the keywords and/or summaries, the content item is tagged with this information, and the tags are stored in the content repository 230 with the metadata for the content item.

Content items and metadata 235 which are stored in content repository 230 are indexed by indexer 270. Indexer 270 uses the keywords that were previously tagged to the content items to generate one or more indices of the content items. The indices that are generated by indexer 270 can then be used by a search engine 280. Search engine 280 can search these indices for particular keywords to identify particular ones of content items 235 that are tagged with the searched keywords. The identified content items can then be retrieved in response to the respective keyword searches.

In addition to providing the capability of tagging content items, the embodiment of FIG. 2 provides functionality for user 200 to be able to author or edit pages. This functionality is provided by page editor 240. User 200 can access page editor 240, either to edit existing pages, or to create new pages that can then be edited. The pages that are edited by editor 240 may be stored in repository 230. As noted above, the content items that are included in the pages may also be stored in repository 230.

If the user wishes to add a content component to the page being edited, the user can do so by accessing component browser 250. Component browser 250 accesses existing content items in repository 230 through a web content management service 260. When the user invokes component browser 250, a window or dialog box is opened for the component browser in page editor 240. Component browser 250 accesses the existing content items through the web content management service and displays these items to the user in the component browser window. Component browser 250 can use runtime environment 290 to search for content items by keyword. Runtime environment 290 which accesses search engine 280 to search keyword indices that are created and maintained by indexer 270. The user can then select one of these component items to be added to the page being edited.

In some embodiments, when the user selects a particular content item that is displayed in the component browser window, a component properties module 255 is invoked. A window for the component properties module is opened within the component browser window. The component properties window displays various properties that are associated with the selected content item. The user may therefore be able to view the properties of the content item, such as the metadata associated with the content item.

In this embodiment, when the component properties module is invoked with respect to the particular content item, the component properties module accesses text mining engine 220. The component properties module enables the text mining engine to be accessed through an API of the text mining engine. Through the API, the component properties module provides the necessary parameters to the text mining engine to allow it to generate a summary of the selected content item.

The information associated with the selected content item may include the keywords associated with the content item, textual content of the item itself, and any other textual information associated with the content item. This information is provided in this embodiment to text mining engine 220. Text mining engine 220 then uses the specified parameters and the information for the content item to generate a summary of the selected content item responsive to the API call from the component properties module.

In some embodiments, the summary generated by text mining engine 220 comprises a newly created content item in its own right. This new content item can be stored in repository 230 in the same manner as other content items and can be re-used in the same way other content items can be re-used. (By contrast, the summaries that may be conventionally created by a user and stored in the metadata of a content item are not separate from the content item and cannot be re-used independently of the content item.) The new summary content item can also be tagged by tagging module 210 and can have its own metadata, which are stored in content repository 230, similar to any other content item. The summary content item may be provided from the text mining engine to page editor 240, which can directly add this new content item to the page being edited.

While the newly generated summary content item is a separate item from the originally selected content item from which it was generated, it may nevertheless be useful in some cases for one or both of the content items to be linked to each other. For instance, if the summary content item is presented in a page as a preview of the full content item, the author of the page will likely wish to provide a link along with the summary content item, where the link enables a viewer of the page to easily access the full content item. Alternatively, the page author may provide a link from the summary content item to a second page, and the author may use a link associated with the summary content item to retrieve the full content item to add this item to the second page. The page author may also find it helpful to have a link associated with the full content item which points to the summary content item and allows the summary content item to be easily retrieved to be added to an edited page.

The summary that is generated by the system may be created in accordance with several parameters. For instance, the desired size of the summary may be specified. This can be done in a number of ways, such as by specifying a percentage of the size of the original content. In one embodiment, the user may indicate a percentage in the range from 1%-99%. This percentage may be indicated, for example, through the use of a slider or similar mechanism that the user can simply move through the available range of values to select the desired value (percentage) for generation of the summary. The text mining engine may then generate the summary such that it has a length which is the designated percentage of the length of the original content item.

The system may be provided with a default percentage (e.g., 20%), such that the summary is generated with a length determined by this default, unless this parameter is overridden by a value provided by the user. The desired length of the summary may also be indicated in other ways, such as by specifying a target number of lines, words or characters. The desired summary length could also be specified by indicating a desired area to be filled by the summary (using designated fonts, formatting, or other style parameters). The desired summary size could also be specified by indicating a type of device on which the summary will be displayed (e.g., a phone, tablet, digital signage device, etc.), where each type of device would be associated with some predetermined measure (e.g., a corresponding percentage of the size of the full selected content item).

It should be noted that, although the summary in the exemplary embodiment described above leverages the ability of text mining engine 220 to generate the summary, this function may be provided in other embodiments by other system components. For example, in some alternative embodiments, this function may be provided by the component properties module, or by another summary-generating component of the system.

As noted above, after the system automatically generates a summary of the selected content, the summary is provided to the page editor so that it can be immediately added to the which is being edited. Either before or after the newly generated summary content item is added to the page, the user may edit the summary. Thus, the user maintains editorial control over this new content item. The user can therefore correct any errors in grammar, spelling, punctuation, and the like, or can modify the formatting or other aspects of the content to preferred styles. As noted above, the newly generated summary content item is saved in the content repository in the same manner as other content items. The summary content item has its own tags, keywords and other metadata, and can be indexed and searched in the same manner as the other content items stored in the repository.

Figure 3:
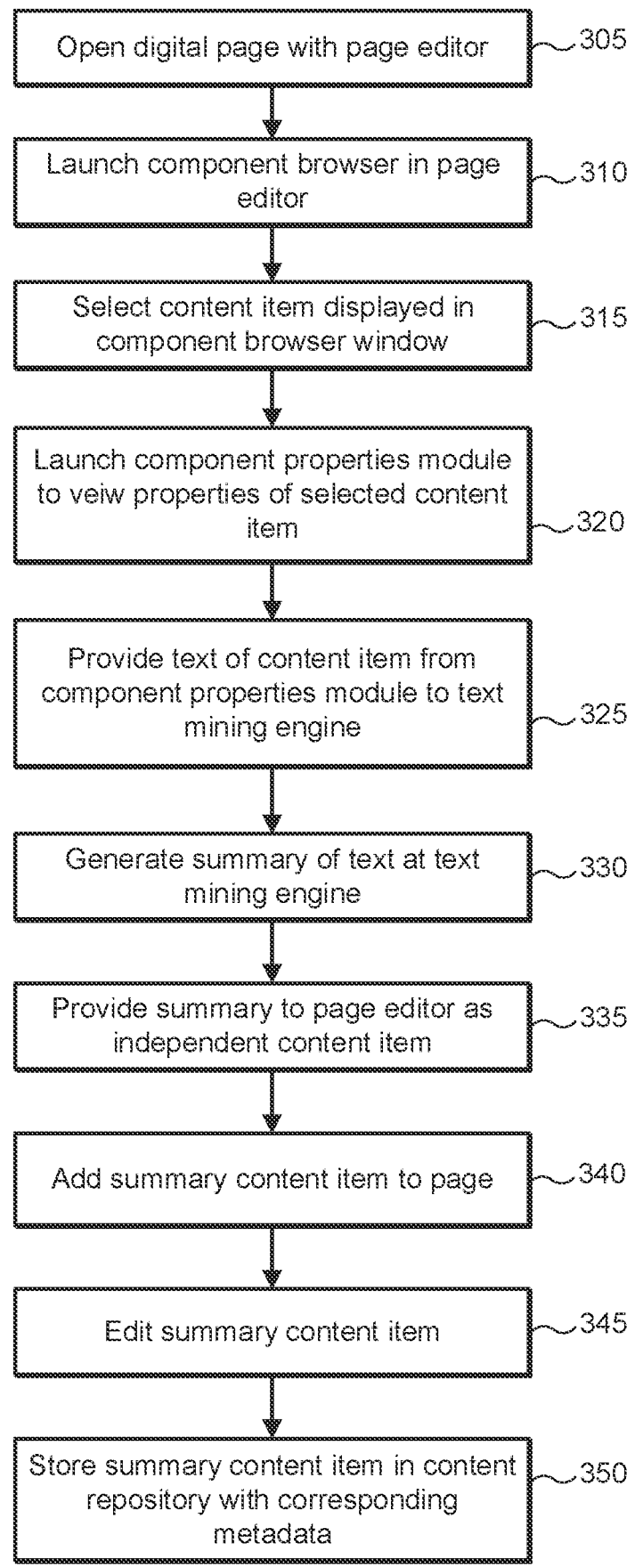
FIG. 3 is a flow diagram illustrating the operation of a web content management system that automatically generates summaries of content items in accordance with some embodiments.

Referring to FIG. 3, a flow diagram illustrating the operation of a web content management system in some embodiments is shown. As depicted in this figure, a user first opens a web page editor (305). The user may create a new page or open an existing page for editing. The user then launches a component browser within the page editor (310). The user can then browse the available content items using the component browser. The component browser accesses the content items in the content repository through a web content management service. The user then selects one of the content items in the component browser window (315).

When the content item is selected, the component browser launches a component properties module (320). The properties of the selected content item are displayed in a component properties window within the component browser. The component properties module accesses a text mining engine via the API of the text mining engine (325). The component properties module may provide various parameters (e.g., size) to the text mining engine when it is accessed. In particular, the component properties module may specify a size for a summary to be generated by the text mining engine. Using the specified parameters, the text mining engine then examines the text associated with the selected content item and generates a summary of the content item based upon the text and the specified summary parameters (330).

The summary generated by the text mining engine is then provided directly to the page editor (335). The summary is provided as an independent content item which can be added by the page editor to the page that is currently being edited (340). The user may edit the summary content item using the page editor in order to correct the grammar of the automatically generated summary, change the formatting of the summary, or otherwise modify the newly generated content item (345). The summary content item can then be saved to the content repository in which the other content items are stored (350). The summary content item may be stored with associated metadata in a manner similar to the other content items. It should be noted that the summary content item may be stored in the content repository either before or after being edited by the user through the page editor.

In addition to the automated generation of summary content items, embodiments of the present web content management system may provide functionality for automatically providing suggestions as to content items that are relevant to the content of a page that is currently being edited, so that the author of the page does not have to manually search for such content items.

Typically, a particular page will be directed to a particular subject. For example, a page may focus on pets, or travel, or some other subject. The author of the page will produce or select content for the page that is relevant to the corresponding subject. A page that is about tourism may have articles on tourist destinations, information on tour companies, reviews by travelers, photographs or videos of travelers or destinations, and various other items. The author may manually generate some of this information, while other pieces of information are retrieved from a collection of previously stored information.

When the author creates or edits the page, the author may use a component browser or an image browser to view content items that are stored in a content repository. If the author wishes to use any of these previously stored content items, the desired items may be selected with the component or image browser and may be added to the page. While this is typically a simple process, the author must browse through the various content items that are stored in the repository in order to identify the items that may be relevant to the subject matter of the page and which the author wishes to add to the page. There may be many (e.g., thousands) of content items stored in the repository, so the examination of the content items to identify specific ones that are of relevance to the page may be a long and tedious process. Embodiments disclosed herein therefore provide means to automatically provide suggestions as to which content items in the repository may be relevant to the subject matter of the page and which the author may wish to add to the page.

Figure 4:
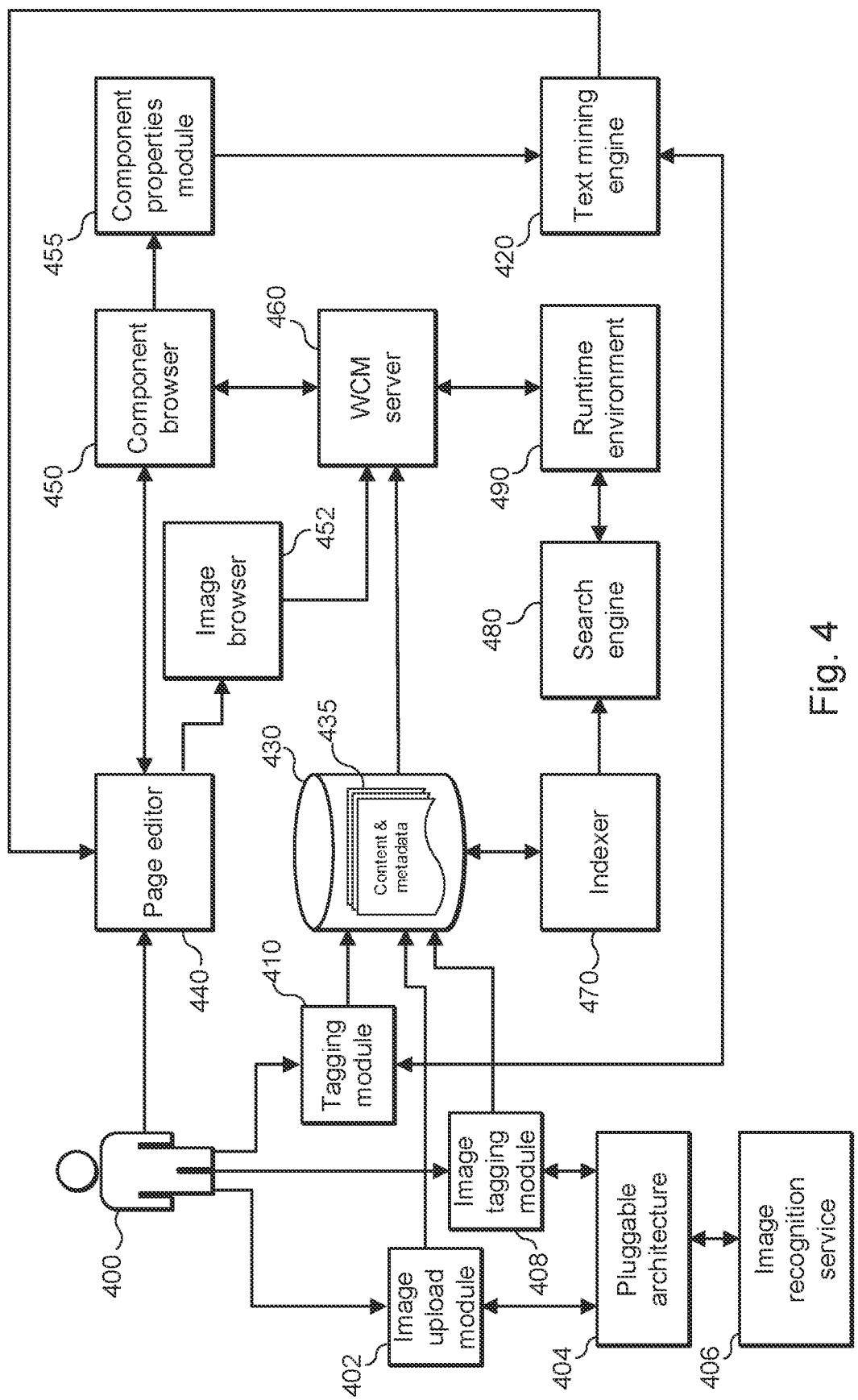
FIG. 4 is a block diagram illustrating the structure a web content management system which is configured to provide automated generation of suggested content items based on text in an existing page and associated assets in accordance with some embodiments.

Referring to FIG. 4, a diagram illustrating the structure of an exemplary embodiment of a web content management system that is configured to provide suggested content items to be added to a currently edited page is shown. The structure of this system is similar to that of the system depicted in FIG. 2.

As in the previously described embodiment, user 400 can tag content items with keywords or summaries using tagging module 410. The content items may be tagged with keywords or summaries as provided by the user, or the content items can be tagged with keywords or summaries that are suggested by text mining engine 420. The embodiment of FIG. 4 also provides an alternative means for automatically tagging images. The user may upload images using upload module 402, and these images are provided to a pluggable architecture 404 to which an image recognition service 406 is connected. When an image is uploaded, the image recognition service processes the image and identifies one or more features of the image. The image recognition service then provides one or more keywords corresponding to the identified features to an automated tagging module 408 which tags the image with the keywords. For example, an uploaded image may be a photograph of a cat, in which case image recognition service 406 may recognize the cat in the image and may provide the keyword "cat" to automated tagging module 408, which then tags the image with this keyword and stores the image and keyword in content repository 430.

The system of FIG. 4 also includes a page editor 440 that can be accessed by user 400 to open a digital page for editing. The user may open an existing page, or may create a new page which can then be edited with the page editor. User 400 may edit assets which are already contained in the page, such as editing the text of a document asset. Alternatively, the user may search for existing digital assets using a component browser 450 or an image browser 452. Both component browser 450 and image browser 452 are used to find and examine content items that are stored in content repository 430. Component browser 450 may be used to find any type of content item that is stored in repository 430, such as documents, images, or structured content of other types. Image browser 452 functions in a manner similar to component browser 450, but is more narrowly intended to be used to find only images in the content repository. When the user finds an appropriate content item using the component browser or image browser, the content item can be selected and added to the page that is currently open in the page editor.

As noted above, there may be thousands of content items which are stored in the content repository and which the user may have to browse through to find content that the user wishes to add to the page that is currently being edited. It may take a considerable amount of time and effort for the user to browse through any significant portion of these content items. The system illustrated in FIG. 4 allows the user to avoid expending this time and effort by automatically providing suggestions as to which content items in the content repository may be relevant to the subject matter contained in the open page and which the user may therefore wish to add to the page. In this embodiment, this functionality is provided in web content management server 460, which examines the subject matter of the open page, analyzes this information to identify relevant keywords, and uses these keywords to generate queries for content items which are then provided as suggestions to the user.

In this embodiment, when user 400 opens a digital page with page editor 440 and launches component browser 450 or image browser 452, the browser accesses web content management server 460. The component browser provides web content management server 460 with a path (a "vpath") for the page so that the server can access the page and examine the textual content of the page. This textual content is analyzed to determine the words that are most relevant to the page so that these words can be used to query the content items that are stored in content repository 430.

It should be noted that there are various types of textual content associated with the page that can be examined and analyzed by the web content management server. For example, if the author has written any text for the page, or if the page includes documents or other text-based content items (in which the body of the content item, rather than metadata or associated information, is text), this text is available to the web content management server. The web content management server may also examine text that is contained in keyword tags or other metadata for the content items in the page. Even if the user has not yet added any content to the page, the page may nevertheless have text associated with it. For instance, the page may have a file name, page properties, keywords, related images or other metadata that are associated with the page. All of this text can be used by the web content management server and analyzed to identify relevant words. These words can then be provided in an API request to runtime environment 490, which is used to query search engine 480 for suggested content.

The textual information that is made available to web content management server 460 may be analyzed in various different ways to determine the more relevant words within this information. In one embodiment, a TF-IDF (term frequency-inverse document frequency) analysis is performed. In this type of analysis, the words that occur most frequently within the text being analyzed are identified. The TF-IDF analysis may be performed in any suitable manner, as known to those skilled in the art. Typically, the words that occur with the greatest frequency are most closely related to the subject matter of the text. The TF-IDF analysis therefore identifies words that are most likely to be indicative of the subject matter of the text.

In this instance, the various different pieces of text are associated with the digital page currently open in page editor 440, so they are indicative of the subject matter of the page. As noted above, the text for the analysis may be derived not only from the explicit textual content of the assets in the page, but also from metadata associated with the assets, including keywords, descriptions and other textual metadata associated with images. As further noted above, even if there are no assets currently contained in the digital page, the metadata of the page itself (e.g., the filename of the page, page properties, associated keywords, and the like) can be used in the TF-IDF analysis, so that the subject matter of the page can nevertheless be assessed.

The words that are produced by the TF-IDF analysis as being indicative of the subject matter of the page are provided by web content management server 460 to runtime environment 490 via a corresponding API. In one embodiment, this information may be provided in the form of a query. Words that have a higher frequency in the TF-IDF analysis may be pushed to the front of the query, while words that have a lower frequency may be pushed to the back of the query. As used here, words "at the front" of the query are words that have more weight or significance in the query, while words "at the back" of the query are those which carry less weight in the query. In some cases, the words which are literally closer to the beginning or "front" of the query are given more weight, but this may differ, depending upon the syntax and structure of the queries in a given embodiment.

Runtime environment 490 uses the information received from web content management server 460 to generate its own query which will be provided to search engine 480. Again, the specific structure of the query may vary from one embodiment to another. In one embodiment, the runtime environment generates an eDisMax query which is provided to the search engine. Essentially, the runtime environment takes the words provided by the web content management server based on the TF-IDF analysis and uses these words to build a query that is suitable for the search engine. In generating the eDisMax query, the runtime environment turns the words into a collection of Boolean queries that encompass permutations of the words generated by the TF-IDF analysis.

As noted above, the query that is generated by runtime environment 490 is provided to search engine 480. Search engine 480 uses the query as the basis for a search of the keyword indices that have been created by indexer 470. These indices are created by indexer 470 from the content items and associated metadata (435) that are stored in content repository 430. The queries of the indices identify content items in repository 430 that are associated with the keywords contained in the query. These content items may include documents, images, or other types of content that are associated with the content of the page.

The results of the query by search engine 480 are returned to runtime environment 490 responsive to the API call. These results are associated with the words identified in the TF-IDF analysis by web content management server 460 and are therefore likely to be relevant to the subject matter examined in this analysis. The results are therefore returned to component browser 450 as suggested content items which are relevant to the subject matter of the page currently open in page editor 440. (If the suggested content comprises images, or if the analyzed text was provided through image browser 452, the suggested content may be returned to image browser 452.) The suggested content received by component browser 450 is then presented to the user in the component browser window. User 400 may then select one of the suggested content items and add the selected item to the page being edited. The content item is added to the page in the same manner as if the user had opened the component browser and selected a content item simply as a result of browsing through the stored content items without having items suggested by the system.

In this embodiment, the system includes a component properties module 455 that can be used to display the properties associated with a selected content item. The component properties module can also access text mining engine 420 to have the text mining engine automatically generate a summary of the selected content item. The component properties module accesses the text mining engine through a corresponding API of the text mining engine, providing parameters such as a desired summary size to the text mining engine to be used in generating the summary of the selected content item. The text mining engine functions in the same manner described above with respect to the embodiment of FIG. 2, using keywords associated with the content item, textual content of the item itself, and any other textual information associated with the content item to generate the summary.

The summary generated by text mining engine 420 is provided to page editor 440 as a separate content item, independent of the source content item upon which the summary was based. The summary content item can be separately stored in repository 430 with the other content items and can be re-used in the same manner as other content items. The summary content item can be tagged with keywords and can have its own metadata, which are stored with the summary content item in content repository 430. The summary content item may be provided from the text mining engine to page editor 440, which can directly add this new content item to the page being edited. Although the summary content item is separate item from the source content item, these content items may be linked to each other.

Figure 5:
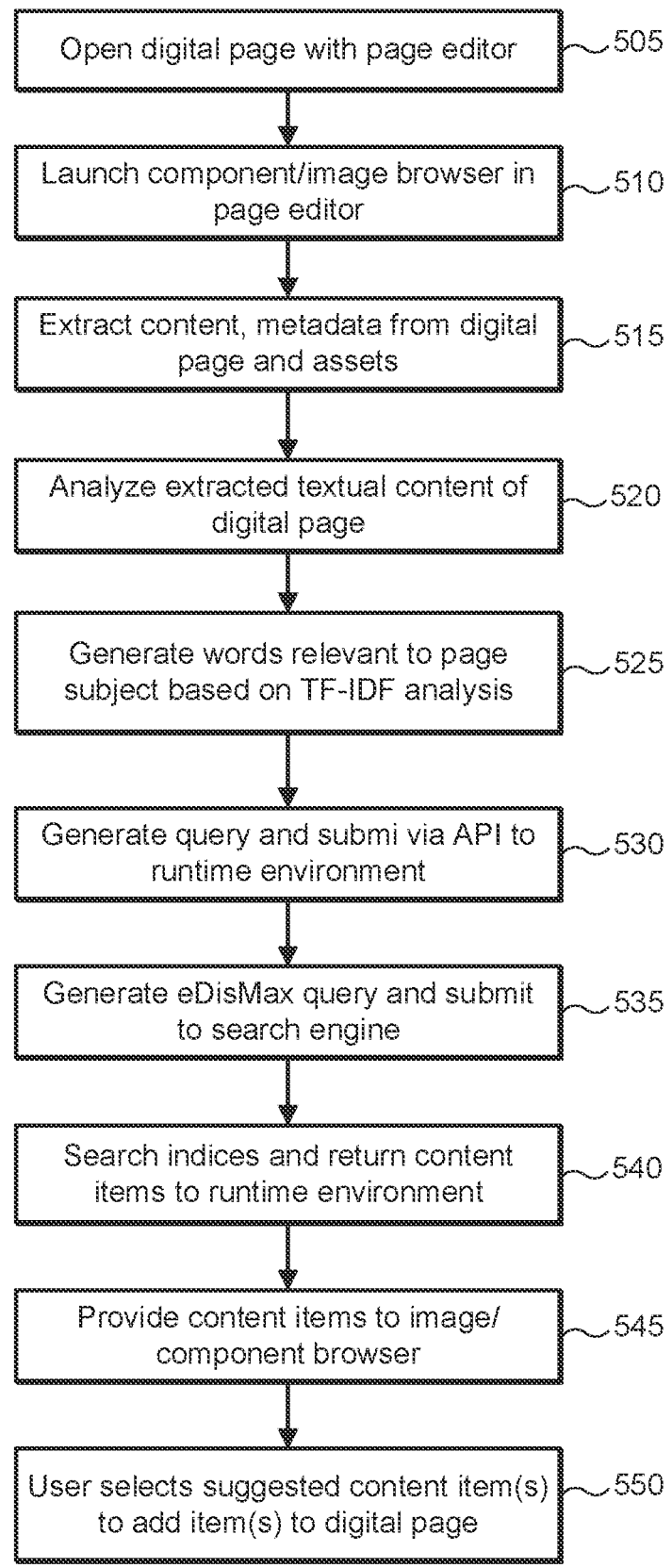
FIG. 5 is a flow diagram illustrating the operation of a web content management system that automatically provides suggested content items for an existing digital page in accordance with some embodiments.

Referring to FIG. 5, a flow diagram illustrating the operation of the web content management system of FIG. 4 is shown. As depicted here, a user initially opens a page editor (505) to edit either an existing digital page, or a page that the user has newly created. Within the page editor, a component browser is launched in order to view content items that are stored in the system's content repository (510). The component browser may be capable of browsing any type of content item in the repository, or it may be an image browser that is configured to allow the user to view only images. The component browser provides a path for the digital page open in the page editor to the web content management server, which uses the path to extract textual information, including the content, name and metadata of the page, as well as the content and metadata of assets that are contained in the page (515). The web content management server then analyzes the textual content that has been extracted from the digital page and corresponding assets to identify the subject matter of the page (520). In one embodiment, this analysis comprises a TF-IDF analysis which identifies the words that appear with the highest frequency in the extracted content (525).

The words generated by the TF-IDF analysis are then provided in a query by the web content management server to the runtime environment via a "suggestions" API (530). The runtime environment uses the words received via the suggestions API query to generate a query which is suitable for the search engine (535). In one embodiment, the query generated by the runtime environment is an eDisMax query, although other types of queries could be generated in other embodiments. The search engine uses the query provided by the runtime environment to search the keyword indices that are maintained by the system's indexer (540). These indices have been generated by the system's indexer based on the content, tags and other metadata associated with (and stored with) the various content items in the content repository. The search engine identifies content items in the repository that are associated with the keywords in the query and returns this information to the runtime environment. The runtime environment then identifies these content items to the component browser, which can display them as suggested content items to the user (545). The user may then select one or more of the suggested content items and add the selected items to the digital page which is currently being edited (550).

Embodiments of the technology may be implemented on a computing system. Any combination of mobile desktop, server machine, embedded or other types of hardware may be used. One exemplary embodiment may be implemented in a distributed network computing environment. The computing environment in this embodiment includes a client computer system and a server computer system connected to a network (e.g., a local area network (LAN), a wide area network (WAN) such as the Internet, mobile network, or other type of network or combination thereof). The network may represent a combination of wired and wireless networks that network computing environment may utilize for various types of network communications.

The client computer system may include, for example, a computer processor and associated memory. The computer processor may be an integrated circuit for processing instructions, such as, but not limited to a CPU. For example, the processor may comprise one or more cores or micro-cores of a processor. The memory may include volatile memory, non-volatile memory, semi-volatile memory or a combination thereof. The memory, for example, may include RAM, ROM, flash memory, a hard disk drive, a solid-state drive, an optical storage medium (e.g., CD-ROM), or other computer readable memory or combination thereof. The memory may implement a storage hierarchy that includes cache memory, primary memory or secondary memory. In some embodiments, the memory may include storage space on a data storage array. The client computer system may also include input/output ("I/O") devices, such as a keyboard, monitor, printer, electronic pointing device (e.g., mouse, trackball, stylus, etc.), or the like. The client computer system may also include a communication interface, such as a network interface card, to interface with the network.

The memory may store instructions executable by the processor. For example, the memory may include an operating system, a page editing or processing program (e.g., a web browser or other program capable of rendering pages) and a server program configured to extend the functionality of the page processing program. Further, the memory may be configured with a page processable (e.g., capable of being rendered by) by the page editing program. The page may be the local representation of a page, such as a web page, retrieved from the network environment. As will be appreciated, while rendering the page, the page editing/processing program may request related resources, such as style sheets, image files, video files, audio files and other related resources as the page is being rendered and thus, code and other resources of the page may be added to the page as it is being rendered.

The server computer system may include, for example, a computer processor and associated memory. The computer processor may be an integrated circuit for processing instructions. For example, the processor may comprise one or more cores or micro-cores of a processor. The processor may comprise a CPU. The memory may include volatile memory, non-volatile memory, semi-volatile memory or a combination thereof. The memory, for example, may include RAM, ROM, flash memory, a hard disk drive, a solid state drive, an optical storage medium (e.g., CD-ROM), or other computer readable memory or combination thereof. The memory may implement a storage hierarchy that includes cache memory, primary memory or secondary memory. In some embodiments, the memory may include storage space on a data storage array. Server computer system 830 may also include I/O devices. The server computer system may also include a communication interface, such as a network interface card, to interface with the network.

The memory may store instructions executable by the processor. For example, the memory may include an operating system and application server code. The application server code can be executable to receive requests from client computers, such as the client computer system, generate or server page files from a set of page assets (e.g., complete web pages, page fragments, scripts or other assets) and return page files in response. A page file may reference additional resources, such as style sheets, images, videos, audio, scripts or other resources at the server computer system or at other network locations, such as at additional server systems.

According to one embodiment, the network environment may be configured with a page such as a web page which is configured to launch and connect to an instance of the server program. The page may include a page file containing page code (HTML or other markup language, scripts or code), stored or generated by the server computer system, that references resources at the server computer system or other network locations, such as additional server computer systems. The page file or related resources may include scripts or other code executable to launch and connect to an instance of the server program.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any, hardware system, hardware mechanism or hardware component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system for generating digital content suggestions in an electronic content management service, the system comprising:
   one or more processors;
   a content management server;
   a digital content repository coupled to the content management server, wherein the digital content repository stores one or more digital content items wherein the digital content items contain at least one document or image;
   a digital page editor executed by the one or more processors to edit a digital page, wherein the digital page editor is coupled to the digital content repository and is executed by the one or more processors to retrieve one or more of the digital content items stored in the digital content repository;
   a component browser coupled to the digital page editor, wherein the component browser is executed by the one or more processors to enable viewing of the one or more digital content items stored in the digital content repository and to enable selection of a first digital content item of the one or more digital content items;
   a search engine coupled to the content management server;
   wherein the content management server extracts textual information from the digital page, analyzes the extracted textual information and thereby identifies words relevant to a subject matter of the digital page, and generates a set of digital content to include on the digital page based at least in part on the identified words;
   wherein the search engine is executed by the one or more processors to receive the digital content from the content management server, search the digital content repository for digital content items according to the digital content, and identify to the content management server or a user one or more digital content items in the digital content repository to add to the digital page;
   wherein the content management server provides to the component browser the identification of the one or more digital content items in the digital content repository;
   wherein the component browser is executed by the one or more processors to provide to the page editor the identification of the one or more digital content items in the digital content repository related to the digital content;
   wherein the digital page editor is executed by the one or more processors to retrieve from the digital content repository one or more digital content items and automatically add to the digital page at least one of the digital content items;
   wherein the content management server performs a TF-IDF (term frequency-inverse document frequency) analysis on the extracted textual information of the digital page, and to include in the digital content query one or more terms which are indicated by the term frequency analysis.

2. The system of claim 1, wherein the page editor is executed by the one or more processors to display the one or more identified digital content items to a user as digital content items, wherein the page editor is executed by the one or more processors to enable selection by the user of one or more of the digital content items, and wherein in response to the user selecting one of the digital contents items the page editor is executed by the one or more processors to remove the selected digital content item from the digital page.

3. The system of claim 1, further comprising a runtime environment coupled to the content management server and the search engine.

4. The system of claim 3, wherein the runtime environment receives from the content management server an initial query that contains the one or more terms which are indicated by the TF-IDF analysis to have a highest term frequency; wherein the runtime environment is configured to generate the digital content query to include a plurality of permutations of the one or more terms which are indicated by the TF-IDF analysis.

5. The system of claim 1, wherein the component browser is executed by the one or more processors to provide to the content management server comprises a path for the digital page, wherein the content management server accesses the digital page via the provided path to extract the textual information from the digital page.

6. The system of claim 1, wherein the content management server extracts the textual information from at least one of: a file name of the digital page; and properties of the digital page.

7. The system of claim 1, wherein the content management server extracts the textual information from a text-based digital content item contained in the digital page.

8. The system of claim 1, wherein the content management server extracts the textual information from metadata of a digital content item contained in the digital page.

9. The system of claim 1 wherein a user is given an option to add additional digital content items to the digital page.

10. The system of claim 1, wherein the component browser comprises an image component browser that is executed by the one or more processors to enable viewing of image digital content items that are stored in the digital content repository.

11. The system of claim 1, further comprising an indexer coupled to the digital content repository and executed by the one or more processors to generate one or more indices of digital content items stored in the digital content repository.

12. The system of claim 11, wherein the search engine is executed by the one or more processors to search the one or more one or more indices according to the digital content query to determine which of the digital content items in the digital content repository are associated with the words identified in the electronic content management server's analysis of the extracted textual information.

13. The system of claim 1, further comprising a tagging module coupled to the digital content repository, wherein the tagging module is executed by the one or more processors to enable a user to append tags to the one or more digital content items stored in the digital content repository.

14. The system of claim 1, further comprising an upload module coupled to the digital content repository, wherein the upload module enables images to be uploaded as corresponding image digital content items to the digital content repository.

15. The system of claim 14, wherein the system comprises a pluggable architecture that enables the system to access an image recognition service, the image recognition service being configured to analyze an image digital content item uploaded to the digital content repository and recognize digital content of the image digital content item, wherein the image recognition service provides one or more keywords associated with the recognized digital content, wherein the keywords are provided to a tagging module that automatically appends the keywords as tags to the recognized image digital content item.

16. The system of claim 1, further comprising a tagging module coupled to the digital content repository, wherein the tagging module is executed by the one or more processors to enable a user to append tags to the one or more digital content items stored in the digital content repository.

17. The system of claim 1, further comprising an indexer coupled to the digital content repository, wherein the electronic content management server enables keywords to be stored in the digital content repository with corresponding ones of the one or more digital content items, wherein the indexer is executed by the one or more processors to maintain an index of the one or more digital content items in the digital content repository according to the corresponding keywords stored with the one or more digital content items, wherein the search engine is coupled to the indexer, and wherein the search engine is executed by the one or more processors to identify the one or more digital content items responsive to the digital content query by identifying digital content items in the digital content repository for which the corresponding keywords are responsive to the digital content query.

18. A system for generating content suggestions in a content management service, the system comprising:
   one or more processors;
   a content management server;
   a content repository coupled to the content management server, wherein the content repository stores one or more content items;
   a digital page editor which is executed by the one or more processors to edit a digital page;
   a search engine coupled to the content management server;
   a runtime environment coupled to the content management server and the search engine;
   wherein the content management server extracts textual information from the digital page, performs a term frequency analysis on the extracted textual information, the term frequency analysis identifying a plurality of words having the highest term frequencies in the digital page, and generates a suggested content query containing the plurality of the words identified by the term frequency analysis as having the highest term frequencies;
   wherein the search engine receives the suggested content query from the content management server, searches the content repository for content items according to the suggested content query, and identifies to the content management server one or more suggested content items in the content repository responsive to the suggested content query;
   wherein the content management server provides to the page editor the identification of the one or more suggested content items in the content repository responsive to the suggested content query; and
   wherein the runtime environment restructures the suggested content query to include a plurality of permutations of the plurality of the words identified by the term frequency analysis as having the highest term frequencies, each permutation having a different arrangement of the plurality of the words identified by the term frequency analysis as having the highest term frequencies, wherein at least one of the plurality of permutations of the one or more words identified by the term frequency analysis comprises an arrangement in which ones of the one or more words identified by the term frequency analysis having higher frequencies are positioned to receive greater weights in the suggested content query, and ones of the one or more words identified by the term frequency analysis having lower frequencies are positioned to receive lower weights in the query.

* * * * *